(12) United States Patent
Danilov et al.

(10) Patent No.: US 10,747,891 B2
(45) Date of Patent: Aug. 18, 2020

(54) FLOATING DATA PROTECTION

(71) Applicant: EMC IP Holding Company LLC, Hopkinton, MA (US)

(72) Inventors: Mikhail Danilov, Saint Petersburg (RU); Audrey Kurilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 245 days.

(21) Appl. No.: 16/007,250

(22) Filed: Jun. 13, 2018

(65) Prior Publication Data

US 2019/0384921 A1 Dec. 19, 2019

(51) Int. Cl.
*G06F 21/60* (2013.01)

(52) U.S. Cl.
CPC .................. *G06F 21/604* (2013.01)

(58) Field of Classification Search
CPC ....... G06F 21/604; G06F 11/08; G06F 21/602
See application file for complete search history.

(56) References Cited

U.S. PATENT DOCUMENTS

| | | | |
|---|---|---|---|
| 2012/0297150 A1* | 11/2012 | Kang | G06F 21/71 711/154 |
| 2016/0380650 A1* | 12/2016 | Calder | G06F 11/1076 714/766 |
| 2017/0060683 A1* | 3/2017 | Luby | G06F 3/0644 |
| 2017/0286710 A1* | 10/2017 | Cheung | G06F 21/6218 |
| 2019/0303243 A1* | 10/2019 | Lee | G06F 3/0619 |

OTHER PUBLICATIONS

Facebook's Warm BLOB Storage System, Muralidhar et al. (Year: 2014).*

* cited by examiner

*Primary Examiner* — Meng Li
(74) *Attorney, Agent, or Firm* — Amin, Turocy & Watson, LLP

(57) ABSTRACT

Floating data protection is presented herein. The method comprises receiving a defined data protection policy; determining that the defined data protection policy is not susceptible to a single point of failure scenario; and in response to determining that the defined data protection policy is not susceptible to the single point of failure scenario, reducing a code fragment associated with a data portion based on the defined data protection policy.

20 Claims, 10 Drawing Sheets

FLOATING DATA PROTECTION

TECHNICAL FIELD

The subject disclosure generally relates to embodiments for the provision of floating data protection.

BACKGROUND

Modern high-end storage systems typically use erasure coding for user data protection. It typically is common practice to use more reliable and more expensive protection schemes for newer data and, commensurately more valuable and more frequently accessed data, while at the same time protecting older less frequently accessed and, therefore, less valuable data with less reliable but cheaper encoding schemes. Such a paradigm allows for higher storage capacity and better use efficiency. Nonetheless, changing protection scheme form a more expensive protection scheme to a lower less expensive protection requires data re-protection, which can be a resource-intensive operation.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
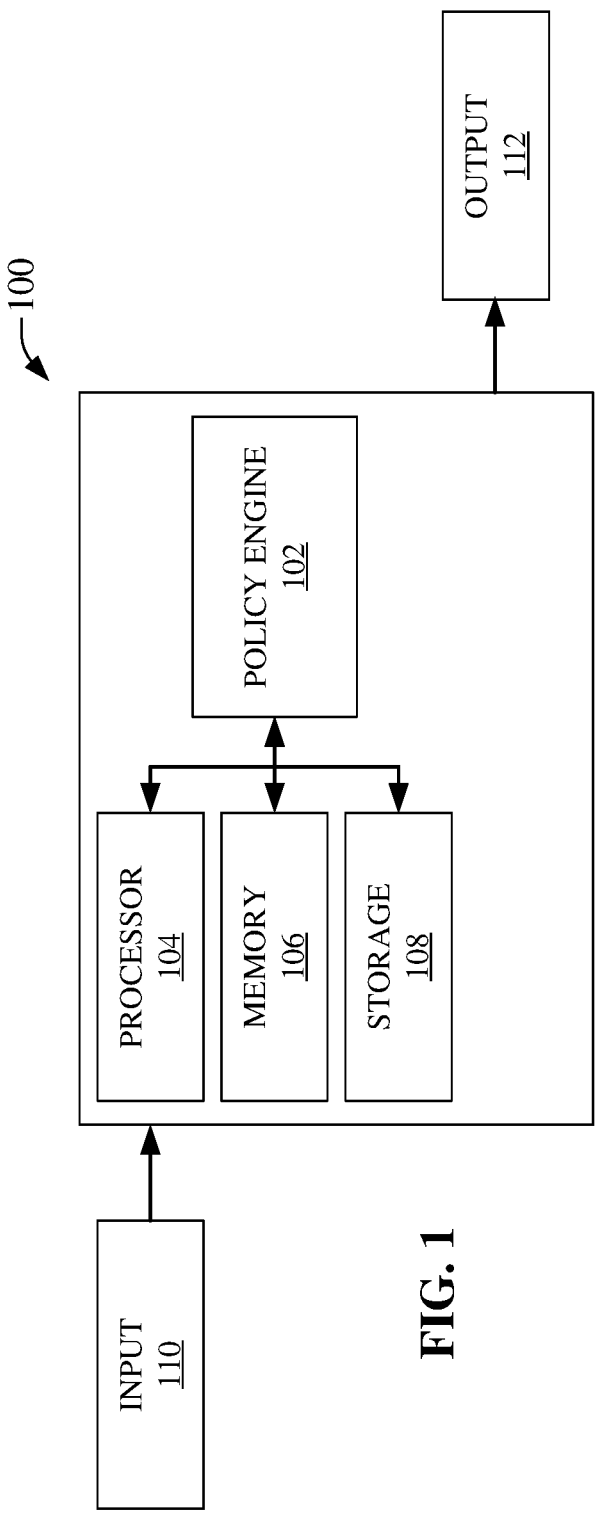
FIG. 1 illustrates a block diagram of a system that provides floating data protection in the context of cloud based data storage architectures, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Storage systems typically keep user data protected with erasure coding (e.g., parity protection and mirroring are particular cases of erasure coding). With erasure coding some data portion (e.g., data object, file, stream, chunk, etc.) can be divided into k data fragments. During encoding redundant m coding fragments can be created. Thus, a protection scheme can be described as k+m. Performed in this manner, the erasure encoding ensures that a storage system can tolerate loss of any m fragments.

Modern high-end storage systems have re-active and pro-active self-healing processes that ensure that data portions (e.g. one or more objects) are complete, consistent, and properly protected.

In order to select an appropriate protection scheme, one needs to note: the greater the number of coding fragments m, a higher data availability and durability is expected. However, the greater the number of coding fragments, the greater the overhead costs associated with providing data protection. With the foregoing considerations in mind, a good enough protection scheme needs defined for a storage system, as a function of, or based on, data comprising at least a value representing the number of disks/nodes that comprise the storage system, and data representing failure probabilities and/or failure rates associated with each of the disks/nodes, values associated with data representative of maximum and/or minimum durations needed to completed disk regeneration processes, and the like.

In most data storage systems there generally is a required level of data availability that needs to be guaranteed. With expected level of data availability data a protection scheme with the minimum number of coding fragments that assures the required level of data availability can be determined.

A protection scheme can be defined for an entire storage system or for a class of data portions. Some storage systems, such as cloud storage systems, allow for the choice to apply the selected protection scheme on a per data set basis.

As will be appreciated, it is quite normal that importance/relevance of data can decrease over time. Accordingly, many storage systems at the enterprise level support features associated with data lifecycle management (DLM), which discounts older data (e.g., data that has been in storage for a time period that exceeds a defined threshold value) as being of less value for continued storage with a high level of protection storage. For instance, data created or used in the last hour would be deemed more valuable, relevant, and/or in need of protection than data that was created and/or last accessed over 12 months ago. In this instance, a data policy can be formulated such that new data is well protected in a high storage tier with an expensive scheme comprising 12 data fragments and 4 coding fragments (e.g., 12+4) for 12 months, and thereafter, when the 12 month threshold has been crossed, to move the data to a lower storage ier and only protect the data with a lesser and cheaper protection scheme comprising 12 data fragment and 2 coding fragments (e.g. 12+2).

The probability of data loss for a given data portion (object, file, stream, chunk, etc.) can be dependent on the remaining lifetime of the data portion. For instance, the probability of data loss can decrease as a data portion draws nearer to the end of its life (e.g., defined expiration date, date of obsolescence, . . . ). For example, assume there is a data portion that is protected with a single coding fragment. Then in order to lose the data portion there has to be a dual failure. Further assume that the remaining lifetime before the data portion becomes obsolete is 24 hours. The value associated with the probability of data portion loss for this near obsolete data portion can tend to approach zero (e.g., ≈30%). Conversely, where the remaining lifetime before the data portion reaches obsolescence is 1000 years, then the value associated with the probability of data portion loss can tend to approach one (e.g., ≈100%).

It is common practice in the field, when moving less valued data portions from high tier storage to lower tiered storage, to change the protection scheme assigned or allocated to the data portions from a first protection scheme to a second protection. Changing of protection schemes nevertheless must assure higher capacity use efficiency without violating availability requirements. Currently, the foregoing is possible via use of multi-tiered storage systems. However, there are drawbacks with changing protection schemes and moving lesser valued data to lower tiered storage. The foregoing scheme can have a high degree of complexity—multi-tiered storage adds additional complexity; and low resource efficiency—data and to be checked, transferred to another tier, (in some instances, checked once again), and protected with another protection scheme. Accordingly, the subject disclosure provides a method to change protection schemes for data portions (objects, files, streams, chunks, etc.) without needing to use complex and resource-inefficient multi-tiering.

As noted above, the subject disclosure provides a method to change protection schemes for data portions/objects/files/streams/chunks using floating data protection. The disclosed floating data protection scheme is simple and extremely resource efficient. In accordance with an embodiment, the method is based on the following observations. In a protection scheme comprising k data fragments and m coding fragments (e.g., k+m) there can exist a coding matrix m×k that can be used to produce m coding fragments out of the k data fragments. Further, a sub-matrix l×k of the coding matrix m×k can exist so that the sub-matrix can be a proper coding matrix for a protection scheme for k data fragments and l coding fragments (e.g., k+l)

Through use of the foregoing observation, it is possible to change protection schemes for data portions from a higher more expensive first protection scheme to a less expensive second protection scheme without the need for re-protection of the data portions. This can be accomplished by discarding one or more of the coding fragments created for the data portions. For example, if a data portion is currently protected using a protection scheme comprising 4 data fragments and 2 coding fragments (e.g., 4+2) as a more expensive first protection scheme, the protection scheme for the data portion can be changed by discarding one coding fragment thereby yielding a less expensive second protection scheme comprising 4 data fragments and 1 coding fragment.

The methodology works as follows: initially a data protection policy is defined to reduce the number of coding fragments for a data portion(s) over a defined duration of time. The data protection policy for the data portion(s) is then implemented and applied to data portion(s) or groups of data portions (e.g., a bucket). Thereafter, the data protection policy is verified to ensure, for example, that the data protection policy is not, and cannot be, subject to a single point of failure. Once the data protection policy has been verified as not being subject to various single point of failure scenarios, the number of coding fragments can be reduced, for example, by deleting one or more coding chunks that are associated with the greatest indices values.

It should be noted that prior to reducing the number of coding fragments, a check can be performed to determine whether the data fragments and coding fragments are consistent (e.g., a check is performed to ensure that the data fragments and the coding fragments for a data portion exist and are not corrupt). Additionally and/or alternatively, and in accordance with one or more various embodiments, the check can be performed as a function of a self-healing process that checks consistency and/or protection of data portions.

Once the check has been performed to ensure data fragment and coding fragment consistency, a further check can be performed to check a desired protection scheme for the data portion and compare the desired protection scheme to a current protection scheme that is currently being applied to the data portion. If the desired protection scheme and the current protection scheme are different, one or more unnecessary coding fragments can be removed without any additional check.

The disclosed systems and methods, in accordance with various embodiments, provide a system, apparatus, or device comprising: a processor; and a memory that stores executable instructions that, when executed by the processor, facilitate performance of operations. The operations can comprise receiving a defined data protection policy; based on the defined data protection policy, verifying the defined data protection policy to ensure that the defined data protection policy is not susceptible to a single point of failure scenario; and in response to determining that the defined data protection policy is not susceptible to the single point of failure scenario, reducing code fragments associated with a data portion based on the defined data protection policy.

Additional operations can comprise determining that a first quantity of the data fragments are not corrupt; determining that a second quantity of the code fragments are not corrupt; determining that the first quantity of the data fragments maintain a data consistency; receiving a second defined data protection policy; comparing a first defined data protection policy with the second defined data protection policy to determine a difference between the first defined data protection policy and the second defined data protection policy, and in response to determining the difference between the first defined data protection policy and the second defined data protection policy, removing at least one of the code fragments.

In the context of the foregoing, the data portion can comprise data fragments and the code fragments, and wherein the defined data protection policy can comprise a first value representing a first quantity of the data fragments and a second value representing a second quantity of the code fragments to be associated with the first quantity of data fragments; the first value can represent a number of data fragments into which the data portion has been split; the second value can represent a number of code fragments with which the data portion is to be protected to ensure that the first quantity of the data fragments remains valid; and the second quantity of code fragments can be determined as a function of a coding matrix.

In accordance with further embodiments, the subject disclosure describes a method, comprising a series of acts that can include: in response to receiving a defined/specified data protection policy, determining, by a device comprising a processor, that the defined/specified data protection policy is not susceptible to a single point of failure scenario; and based on the determining, reducing, by the device, code fragments associated with a data portion based on the defined/specified data protection policy. Additional acts that can be performed can comprise: wherein the defined data protection policy is a first defined/specified data protection policy, receiving, by the device, a second defined/specified data protection policy; comparing the first defined/specified data protection policy with the second defined/specified data protection policy to determine a difference between the first defined/specified data protection policy and the second defined/specified data protection policy; and in response to determining the difference between the first defined/specified data protection policy and the second defined/specified data protection policy, removing at least one of the code fragments.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can comprise: receiving a defined data protection policy; determining that the defined data protection policy is not susceptible to a single point of failure scenario; and in response to determining that the defined data protection policy is not susceptible to the single point of failure scenario, reducing a code fragment associated with a data portion based on the defined data protection policy. Further operations can include: wherein the defined data protection policy is a first defined data protection policy, receiving a second defined data protection policy, and comparing the first defined data protection policy with the second defined data protection policy to determine a difference between the first defined data protection policy and the second defined data protection policy.

In regard to the foregoing, the data portion can comprise a data fragment and the code fragment, and the defined data protection policy can comprise a first value representing a first quantity associated with the data fragment and a second value representing a second quantity associated with the code fragment to be associated with the first quantity; the first value can represent a number of data fragments into which the data portion has been partitioned; and the second value can represent a number of code fragments with which the data portion is to be protected to ensure that the first quantity of data fragments associated with the first value remain valid.

With reference now to the Figures, FIG. 1 depicts a system 100 that provides for floating data protection in the context of cloud based data storage architectures, in accordance with various example embodiments. System 100 can for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

System 100 can comprise policy engine 102 that can be in operative communication with processor 104, memory 106, and storage 108. Policy engine 102 can be in communication with processor 104 for facilitating operation of computer-executable instructions or machine-executable instructions and/or components by policy engine 102, memory 106, for storing data and/or computer-executable instructions and/or machine-executable instructions and/or components, and storage 108 for providing longer term storage of data and/or machine-readable instructions and/or computer-readable instructions. Additionally, system 100 can also receive input 110 for use, manipulation, and/or transformation by policy engine 102 to produce one or more useful, concrete, and tangible results, and/or transform one or more articles to different states or things. Further, system 100 can also generate and output the useful, concrete, and tangible results and/or the transformed one or more articles as output 112.

As has been noted above, in a protection scheme comprising k data fragments and m coding fragments (e.g., k+m) there can exist a coding matrix m×k that can be used to produce m coding fragments out of the k data fragments. Further, a sub-matrix l×k of the coding matrix m×k can exist so that the sub-matrix can be a proper coding matrix for a protection scheme for k data fragments and l coding fragments (e.g., k+l).

Based on the foregoing consideration, policy engine 102 can change protection schemes for data portions from a higher more expensive first protection scheme to a less expensive second protection scheme without the need for re-protection of the data or objects. Policy engine 102 can accomplish this by discarding one or more of the coding fragments created for the data portions. For instance, if a data portion is currently protected using a protection scheme comprising 4 data fragments and 2 coding fragments (e.g., 4+2) as a more expensive first protection scheme, the protection scheme for the data portion can be changed by discarding or removing one coding fragment thereby yielding a less expensive second protection scheme comprising 4 data fragments and 1 coding fragment.

Policy engine 102 in various embodiments can thus receive a data protection policy, for example as input 110, that can have been defined to reduce the number of coding fragments for a data portion(s) over a defined duration of time. The data protection policy for the data portions(s) can then be implemented and applied by policy engine 102 data portions(s) or groups of data portions (e.g., buckets). Policy engine 102 can then verify the data protection policy to ensure, for example, that the data protection policy is not, and cannot be, subject to a single point of failure. Once policy engine 102 has verified that the data protection policy cannot be subject to various single point of failure scenarios, policy engine 102 can reduce the number of coding fragments, for example, by deleting one or more coding chunks that are associated with the greatest indices values.

Policy engine 102, prior to reducing the number of coding fragments, performs a check to determine whether the data fragments and the coding fragments are consistent (e.g., policy engine 102 checks to ensure that the data fragments and the coding fragments for a data portion exist and are not corrupt). Additionally and/alternatively, policy engine 102 can perform the check as a function of a self-healing process the checks consistency and/or protection of data portions.

Policy engine 102, once the check has been performed to ensure data fragment and coding fragment consistency, can perform a consistency check to determine whether a desired (prospective) protection scheme for the data portion is appropriate, wherein a desired (prospective) protection scheme is compared to a current protection scheme that is currently being applied to the data portion. If policy engine 102 determines that the desired (prospective) protection scheme and the current protection scheme a different, policy engine 102 can remove one or more of unnecessary coding fragments without any additional checks needing to be performed.

Figure 2:
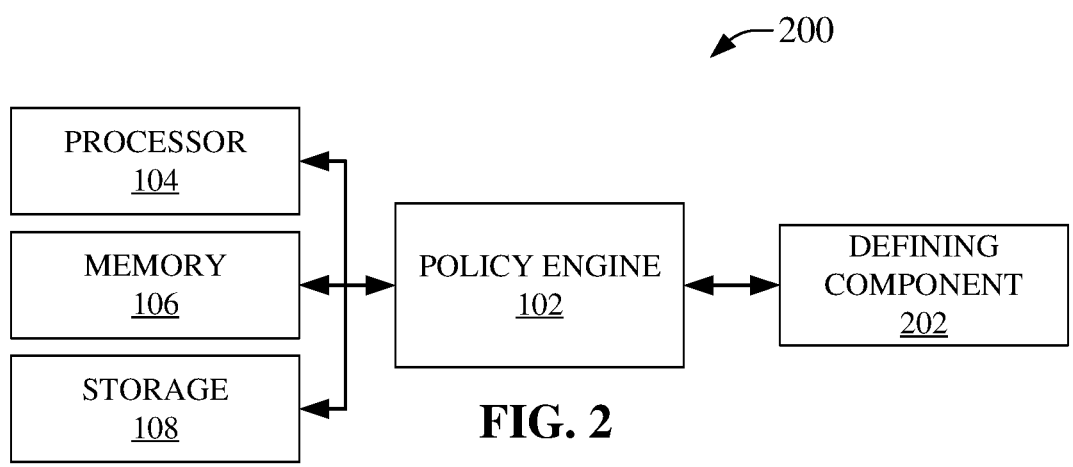
FIG. 2 illustrates an additional system that provides floating data protection in the context of cloud based data storage architectures, in accordance with various example embodiments.

FIG. 2 provides further depiction of system 100, now depicted as system 200, that provides for floating data protection in the context of cloud based data storage architectures, in accordance with various example embodiments. System 200, as illustrated, can comprise defining component 202 that can operate in conjunction with policy engine 102, processor 104, memory 106, and storage 108 to define a data protection policy to reduce the number of coding fragments for a data portion over a defined duration of time. For instance, a data protection policy can comprise reducing the number of coding fragments from 2 to 1 after a first storage time epoch, and there after reducing the coding fragments from 1 to 0 after a second storage time epoch.

Figure 3:
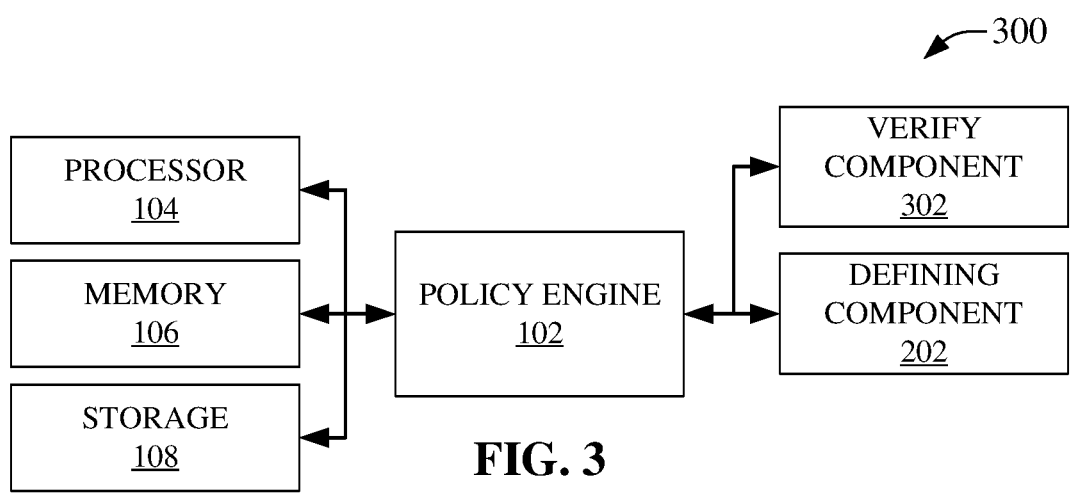
FIG. 3 illustrates yet a further system that provides floating data protection in the context of cloud based data storage architectures, in accordance with various example embodiments.

FIG. 3 provides further illustration of system 100, now referenced as system 300, that provides for floating data protection in the context of cloud based data storage architectures, in accordance with various example embodiments. System 300, as depicted, can comprise verify component 302 that in conjunction with defining component 202, policy engine 102, processor 104, memory 106, and storage 108 can verify that the data protection policy cannot be subject to a single point of failure. For instance, verify component 302 can ensure that the data protection policy that comprises reducing the number coding fragments from 2 to 1 after a first storage time epoch, and thereafter reducing the coding fragments from 1 to 0 after a second storage epoch is not subject to a single point of failure.

Figure 4:
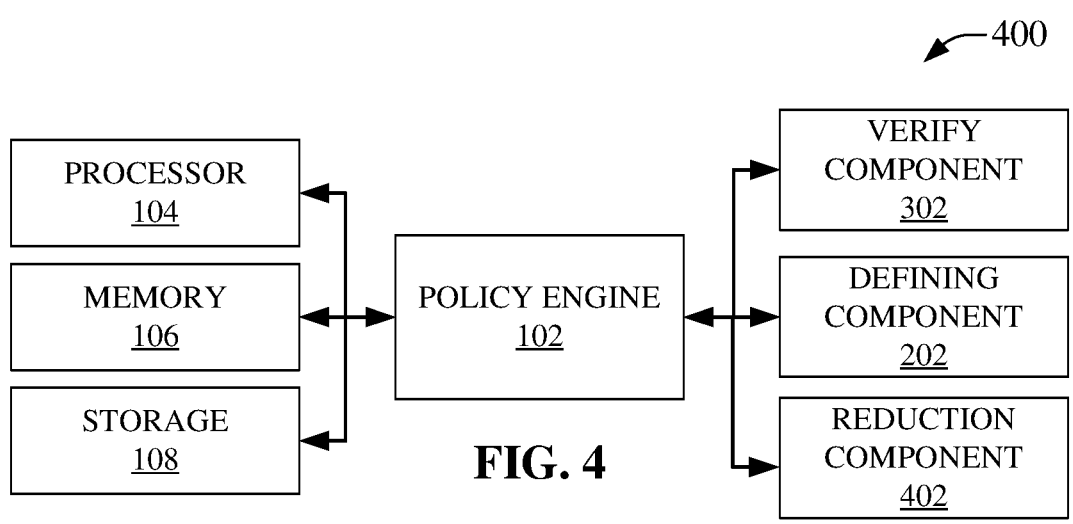
FIG. 4 depicts a further system that provides floating data protection in the context of cloud based data storage architectures, in accordance with various example embodiments.

FIG. 4 provides additional illustration of system 100, now referenced as system 300, that provides for floating data protection in the context of cloud based data storage architectures, in accordance with various example embodiments. System 400, as illustrated, can comprise reduction component 402 that can operate in collaboration with verify component 302, defining component 202, policy engine 102, processor 104, memory 106, and storage 108 to facilitate and/or effectuate reduction in the number of coding fragments. For example, reduction component 402, as a function of the verified data protection policy, can reduce the number of coding fragments from 2 to 1 after a first storage time epoch, and thereafter reduce the coding fragments from 1 to 0 after a second storage epoch.

Figure 5:
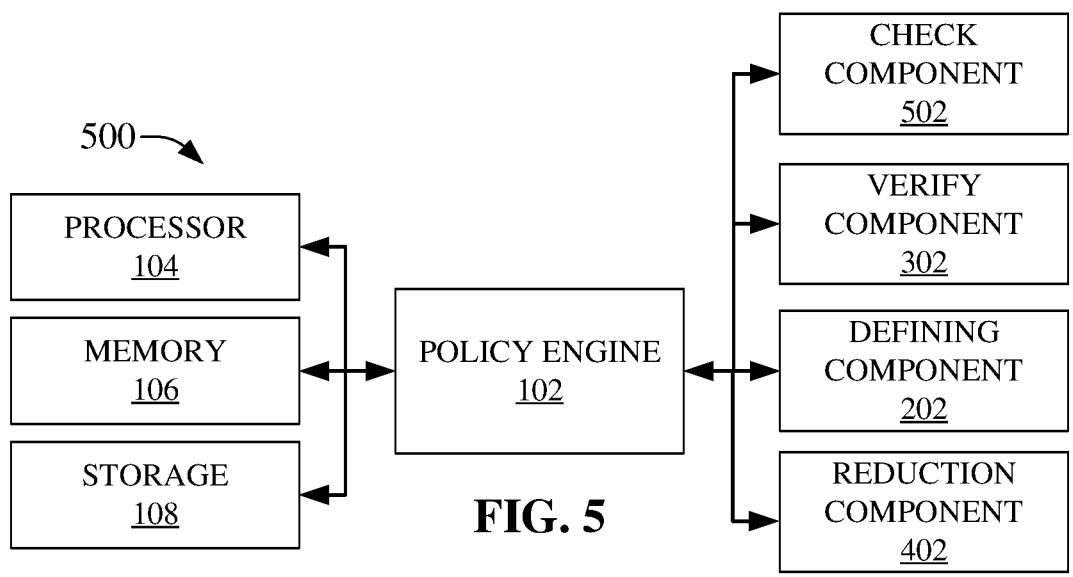
FIG. 5 illustrates another system that provides floating data protection in the context of cloud based data storage architectures, in accordance with various example embodiments.

FIG. 5 provides yet further depiction of system 100, referenced now as system 500, that provides for floating data protection in the context of cloud based data storage architectures, in accordance with various example embodiments. System 500, as depicted, can comprise check component 502 that can be communicatively coupled to reduction component 402, verify component 302, defining component 202, policy engine 102, processor 104, memory 106, and storage 108. Check component 502 can be utilized by policy engine 102 prior to the performing a reduction of the number of coding fragments by reduction component 402. In accordance with various embodiments, check component 502 can determine whether the data fragments and the coding fragments are consistent (e.g., the check is performed to ensure that the data fragments and the coding fragments for a particular data portion exist and are not corrupt). Check component 502 can perform the check as a function of a self-healing process that checks consistency and/or protection of data portions.

Figure 6:
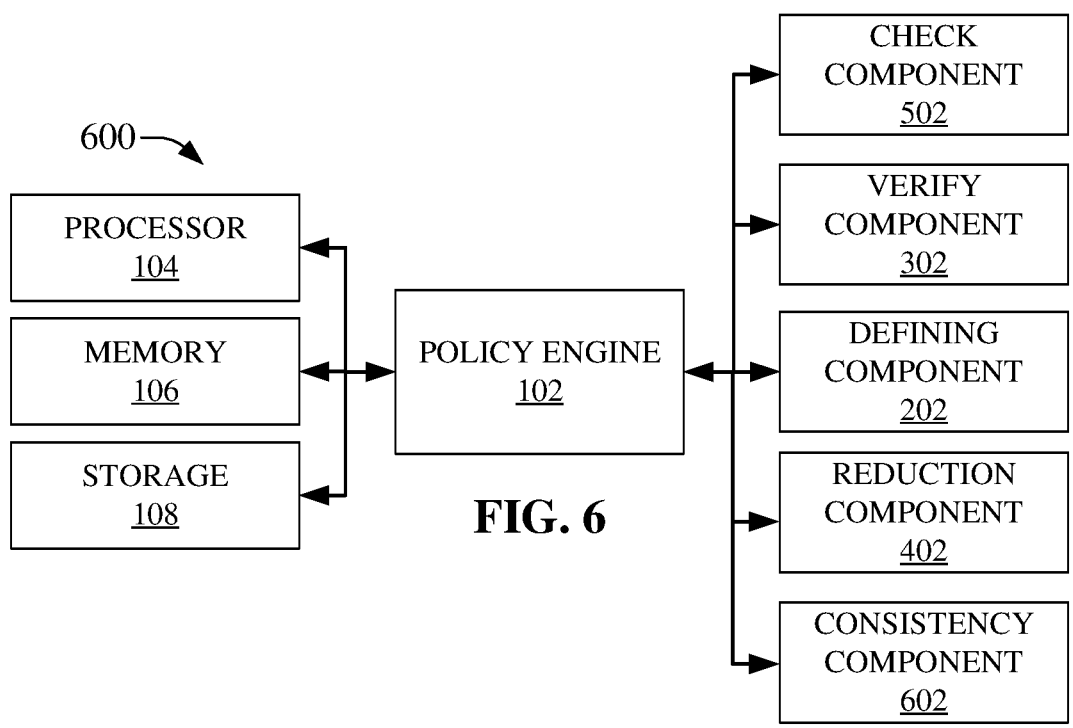
FIG. 6 illustrates a yet another system that provides floating data protection in the context of cloud based data storage architectures, in accordance with various example embodiments.

FIG. 6 provides additional depiction of system 100, referenced as system 600, that provides for floating data protection in the context of cloud based data storage architectures, in accordance with various example embodiments. System 600 can include consistency component 602 that performs a consistency check to determine whether a desired (prospective) protection scheme for a data portion is appropriate, wherein a desired (prospective) protection scheme is compared, by consistency component 602, with a currently applied protection scheme. Consistency component 602 compares the currently applied protection scheme with the desired (prospective) protection scheme, and in response to determining that there is a difference between the desired (prospective) protection scheme and the currently applied protection scheme, consistency component 602 in conjunction with reduction component 402, for example, can remove one or more unnecessary coding fragment without any additional checks needing to be made performed by policy engine 102.

Figure 7:
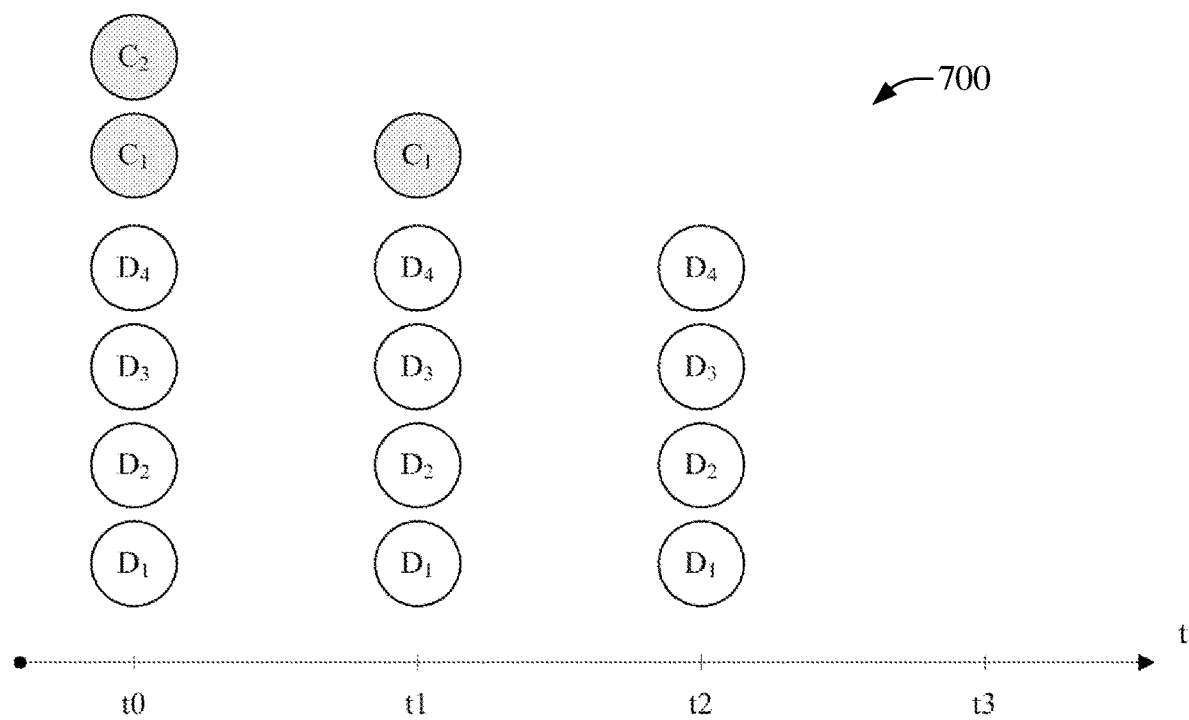
FIG. 7 illustrates a schematic illustrating floating data protection in an accordance with various example embodiments.

FIG. 7 illustrates the transformation of a protection scheme as applied to a data portion. As depicted a time horizon (t) that extends from left to right is illustrated. Four time epochs (t0, t1, t2, t3) are also illustrated. In initial time epoch t0, the data portion is protected with a protection scheme of 4 data fragments ($D_1$, $D_2$, $D_3$, $D_4$) and 2 coding fragments ($C_1$ and $C_2$) (e.g., first defined protection scheme 4+2). At time epoch t1, through application of a less expensive second defined protection scheme (4+1) a coding fragment $C_2$ can be removed thereby reducing the code fragment by one; the storage capacity requirements for the data portion, that at time epoch t0 had 6 fragments is reduced to five fragments (e.g., 4 data fragments ($D_1$, $D_2$, $D_3$, $D_4$) and 1 coding fragments ($C_1$) at time epoch t1. At time epoch t2 an even less expensive third defined protection scheme (4+0) can be applied to the data portion. In time epoch t2 the 4 data fragments ($D_1$, $D_2$, $D_3$, $D_4$) are not protected by any coding fragments. In time epoch t2 the 4 data fragments ($D_1$, $D_2$, $D_3$, $D_4$) are assigned marginal value and as such no coding fragments are needed to protect the data. As will be observed, at time epoch t3 the 4 data fragments ($D_1$, $D_2$, $D_3$, $D_4$) can have been removed from the data storage system as the data portion has reached obsolescence and are no longer need for data retention purposes.

The foregoing floating data protection scheme can find applicability and functionality in relation to Elastic Cloud Storage (ECS) systems. ECS data storage systems typically protects data, not at an object level, but at a chunk level, wherein a chunk is a block of fixed size that stores segments of one or more data portions. Accordingly and in accordance with various embodiments, the disclosed floating data protection scheme can be utilized in regard to chunks by ensuring that data portions the comprise a chunk share a single/common data protection policy, and if so, based on the single/common data protection policy, the single/common data protection policy can be applied to the entire chunk.

As used herein, the term "cloud" can refer to a cluster, data storage cluster, etc. comprising a group of nodes, data storage nodes, etc., e.g., comprising a group of network servers (e.g., comprising storage devices, disk drives, etc.), within a distributed, e.g., globally distributed, storage system—the group of storage nodes being communicatively and/or operatively coupled to each other, and hosting a group of applications utilized for servicing user requests. In general, the storage nodes can communicate with user devices via wired and/or wireless communication network(s) to provide access to services that are based in the cloud and not stored locally, e.g., on a user device. A typical cloud-computing environment can include multiple layers, aggregated together, which interact with each other to provide resources for end-users.

The foregoing floating data protection method and disclosed system can be employed by a object storage system, such as an Elastic Cloud Storage (ECS) system, and can be utilized in storage environment(s) corresponding to embodiments disclosed herein. For example, FIG. 9 illustrates an ECS storage system comprising a cloud-based object storage appliance in which corresponding storage control software comprising, e.g., ECS data client(s), ECS management client(s), storage service(s), etc. and storage media, e.g., physical magnetic disk media, storage devices, etc. of respective ECS nodes of an ECS cluster, are combined as an integrated system with no access to the storage media other than through the ECS system.

Figure 9:
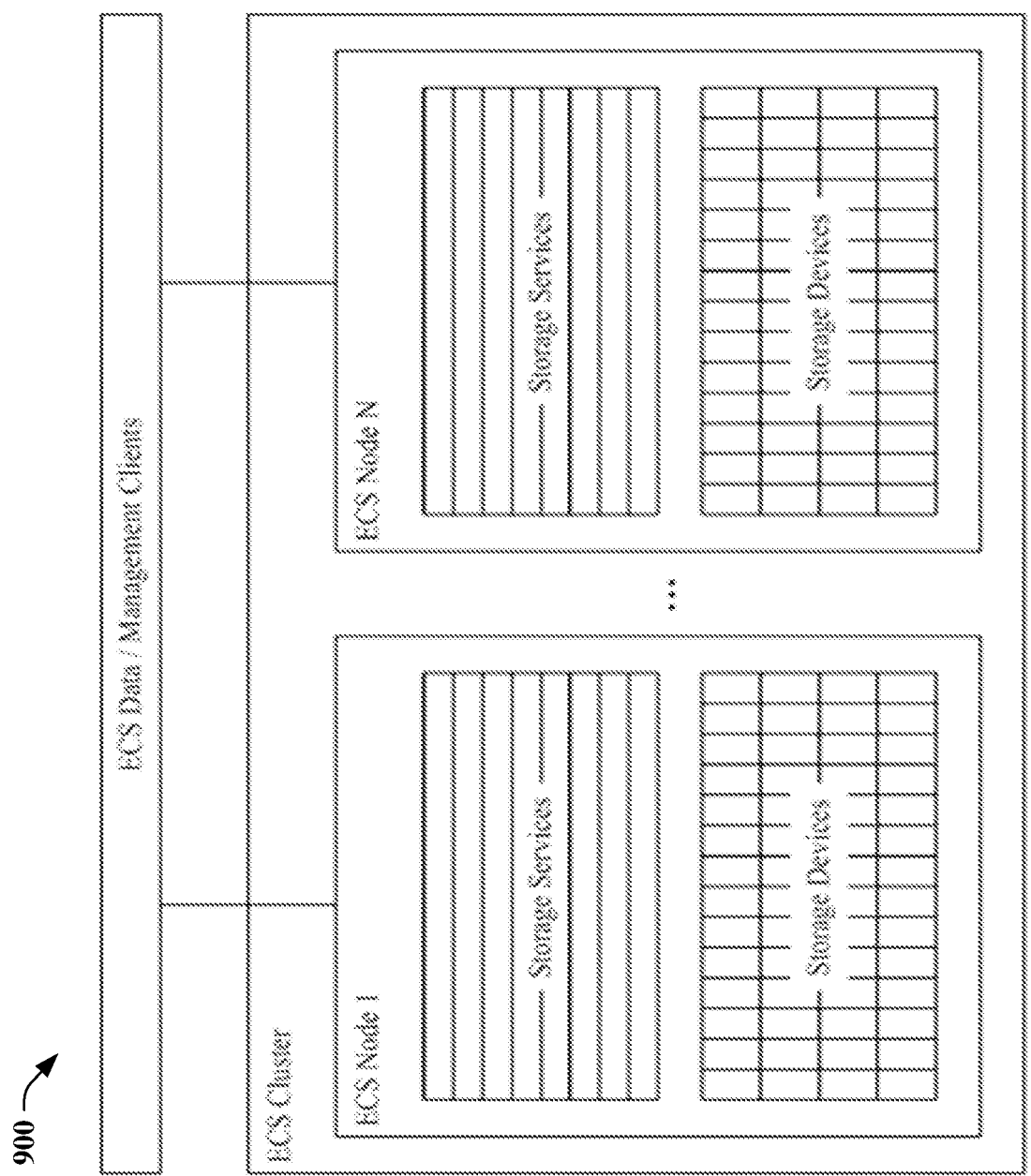
FIG. 9 illustrates an elastic cloud storage (ECS) system, in accordance with various example embodiments.

In this regard, as illustrated by FIG. 9, an ECS cluster comprises multiple nodes, storage nodes, ECS nodes, etc. Each node is associated with storage devices, e.g. hard drives, physical disk drives, storage media, etc. In embodiment(s), an ECS node executing on a hardware appliance can be communicatively coupled, connected, cabled to, etc., e.g., 15 to 120 storage devices. Further, each ECS node can execute one or more services for performing data storage operations described herein.

The ECS system is an append-only virtual storage platform that protects content from being erased or overwritten for a specified retention period. In particular, the ECS system does not employ traditional data protection schemes like mirroring or parity protection. Instead, the ECS system utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS system can support storage, manipulation, and/or analysis of unstructured data on a massive scale on commodity hardware. As an example, the ECS can support mobile, cloud, big data, and/or social networking applications. In another example, the ECS can be deployed as a turnkey storage appliance, or as a software product that can be installed on a set of qualified commodity servers and disks, e.g., within a node, data storage node, etc. of a cluster, data storage cluster, etc. In this regard, the ECS can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As illustrated by FIG. 1, a policy engine (102) can be a part of a storage service layer (e.g., storage services illustrated by FIG. 9) of the cloud-based data storage system, and can handle data availability and protection against data corruption, hardware failure(s,) and/or data center disasters. In embodiment(s), the policy engine can be a distributed, shared service, storage service, etc. that can run on each node, ECS node, etc., As an example, the storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Figure 8:
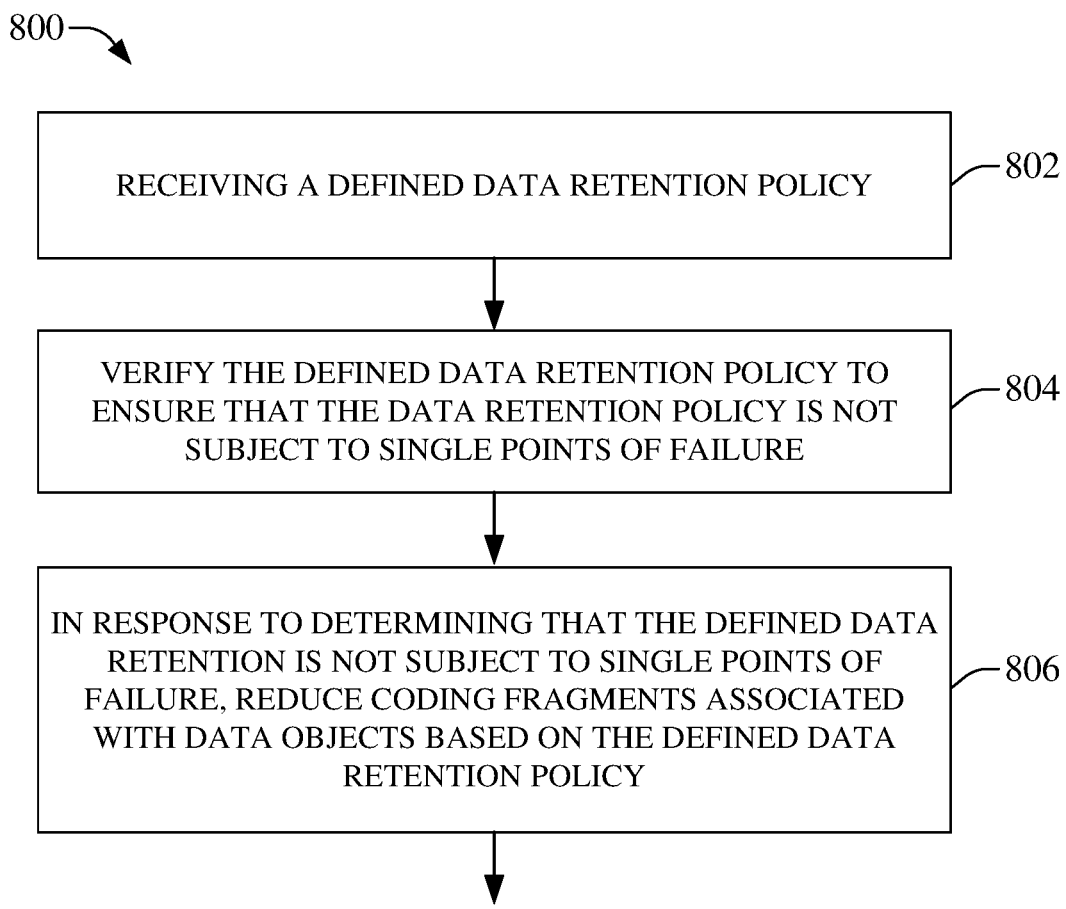
FIG. 8 illustrates a flow chart of a method for providing floating data protection in the context of cloud based data storage architectures, in accordance with various example embodiments.

FIG. 8 illustrates a methodology for performing operations corresponding to a system 100, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 8, a methodology 800 for performing operations corresponding to a cloud-based storage system is illustrated, in accordance with various example embodiments. The method 800 can commence at act 802 where a defined data protection policy can be received (e.g., by system 100 and in particular policy engine 102). At 804 system 100 (e.g., policy engine 102), in response to receiving the defined data protection policy, can verify the defined retention policy to ensure that the received data protection policy is not subject to, and is not vulnerable to, single points of failure scenarios. At 806, policy engine 102, in response to determining that the defined data protection policy is not, and cannot be, subject to single points of failure scenarios, can reduce coding fragments associated with data portions based on, or as a function of, the defined data protection policy.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to store a batch of objects in a group of data chunks, and based on a determination that respective data chunks of the group of data chunks contain a defined amount of data, seal, erasure encode, and replicate the respective data chunks, as described herein.

A classifier can be a function that maps an input attribute vector, $x=(x1, x2, x3, x4, xn)$, to a confidence that the input belongs to a class, that is, $f(x)=confidence (class)$. Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by policy engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
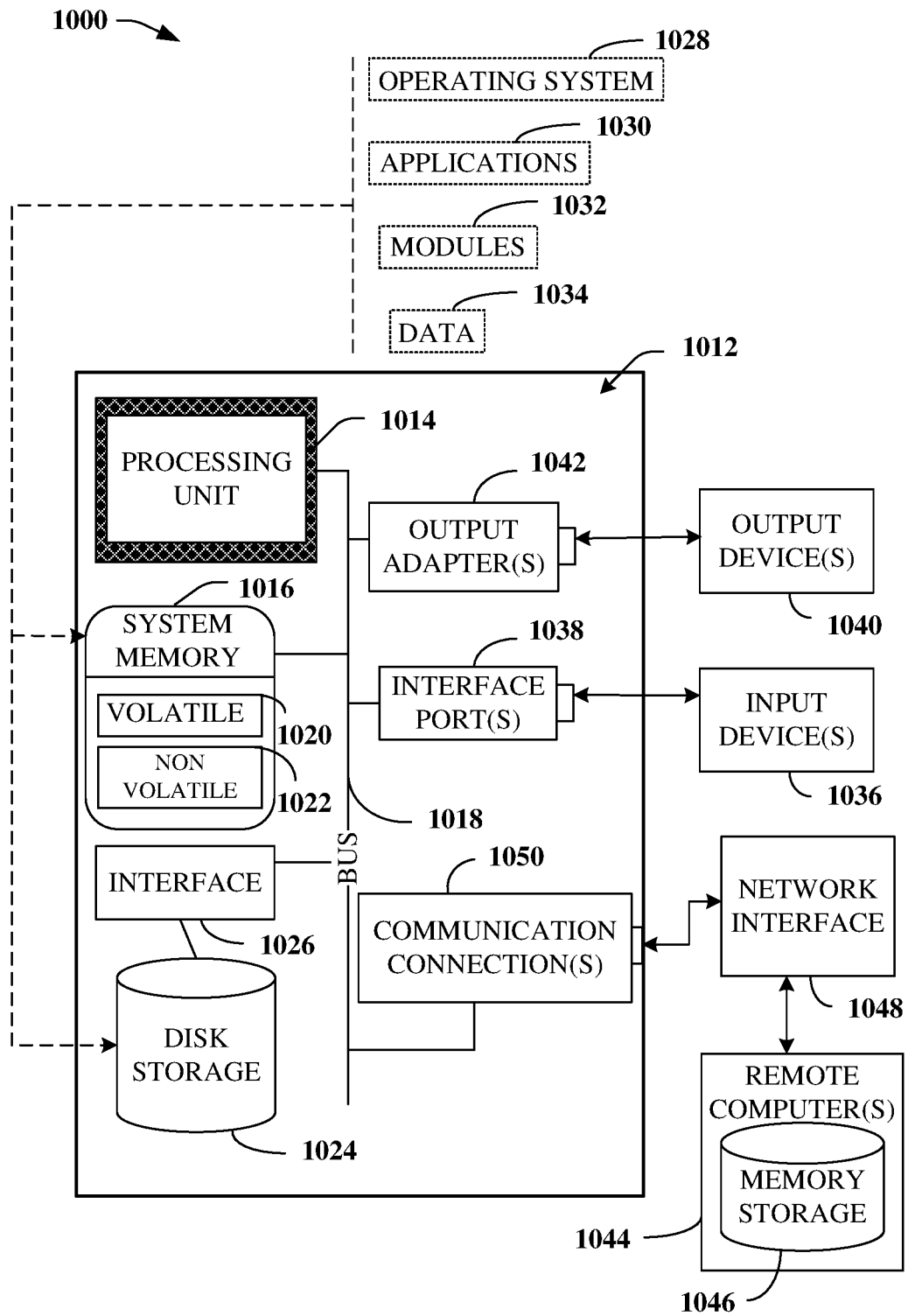
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., system 100, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A system, comprising:
 a processor; and
 a memory that stores executable instructions that, when executed by the processor, facilitate performance of operations, comprising:
  receiving a defined data protection policy;
  based on the defined data protection policy, verifying the defined data protection policy to ensure that the defined data protection policy is not susceptible to a single point of failure scenario; and
  in response to the verifying indicating that the defined data protection policy is not susceptible to the single point of failure scenario, reducing code fragments associated with a data portion based on the defined data protection policy.
2. The system of claim 1, wherein the data portion comprises data fragments and the code fragments, and wherein the defined data protection policy comprises a first value representing a first quantity of the data fragments and a second value representing a second quantity of the code fragments to be associated with the first quantity of data fragments.
3. The system of claim 2, wherein the first value represents a number of data fragments into which the data portion has been split.
4. The system of claim 2, wherein the second value represents a number of code fragments with which the data portion is to be protected to ensure that the first quantity of the data fragments remains valid.
5. The system of claim 2, wherein the second quantity of code fragments is determined as a function of a coding matrix.
6. The system of claim 2, wherein the operations further comprise determining that first quantity of the data fragments is not corrupt.
7. The system of claim 2, wherein the operations further comprise determining that the second quantity of the code fragments is not corrupt.
8. The system of claim 2, wherein the operations further comprise determining that the first quantity of the data fragments maintain a data consistency.
9. The system of claim 1, wherein the defined data protection policy is a first defined data protection policy, and wherein the operations further comprise receiving a second defined data protection policy.
10. The system of claim 9, wherein the operations further comprise comparing the first defined data protection policy with the second defined data protection policy to determine a difference between the first defined data protection policy and the second defined data protection policy.
11. The system of claim 10, wherein the operations further comprise in response to determining the difference between the first defined data protection policy and the second defined data protection policy, removing at least one of the code fragments.
12. A method, comprising:
 in response to obtaining a defined data protection policy, determining, by a device comprising a processor, that the defined data protection policy is not susceptible to a single point of failure scenario; and
 based on the determining, reducing, by the device, code fragments associated with a data portion based on the defined data protection policy.
13. The method of claim 12, wherein the defined data protection policy is a first defined data protection policy, and further comprising receiving, by the device, a second defined data protection policy different from the first defined data protection policy.
14. The method of claim 13, further comprising comparing, by the device, the first defined data protection policy with the second defined data protection policy to determine a difference between the first defined data protection policy and the second defined data protection policy.
15. The method of claim 14, further comprising, in response to determining the difference between the first defined data protection policy and the second defined data protection policy, removing, by the device, at least one of the code fragments.
16. A machine-readable storage medium comprising instructions that, in response to execution, cause a system comprising a processor to perform operations, comprising:
 determining that a specified data protection policy is not susceptible to a single point of failure scenario; and
 in response to determining that the specified data protection policy is not susceptible to the single point of failure scenario, reducing a code fragment associated with a data portion based on the specified data protection policy.

17. The machine-readable storage medium of claim 16, wherein the data portion comprises a data fragment and the code fragment, and wherein the specified data protection policy comprises a first value representing a first quantity associated with the data fragment and a second value representing a second quantity associated with the code fragment to be associated with the first quantity.

18. The machine-readable storage medium of claim 17, wherein the first value represents a number of data fragments into which the data portion has been partitioned.

19. The machine-readable storage medium of claim 17, wherein the second value represents a number of code fragments with which the data portion is to be protected to ensure that the first quantity of data fragments associated with the first value remain valid.

20. The machine-readable storage medium of claim 17, wherein the specified data protection policy is a first specified data protection policy, wherein the operations further comprise receiving a second specified data protection policy, and wherein the operations further comprise comparing the first specified data protection policy with the second specified data protection policy to determine a difference between the first specified data protection policy and the second specified data protection policy.

\* \* \* \* \*